Sept. 9, 1958
C. D. DUNBAR
2,851,242
GATE VALVE
Filed July 7, 1953
2 Sheets-Sheet 1
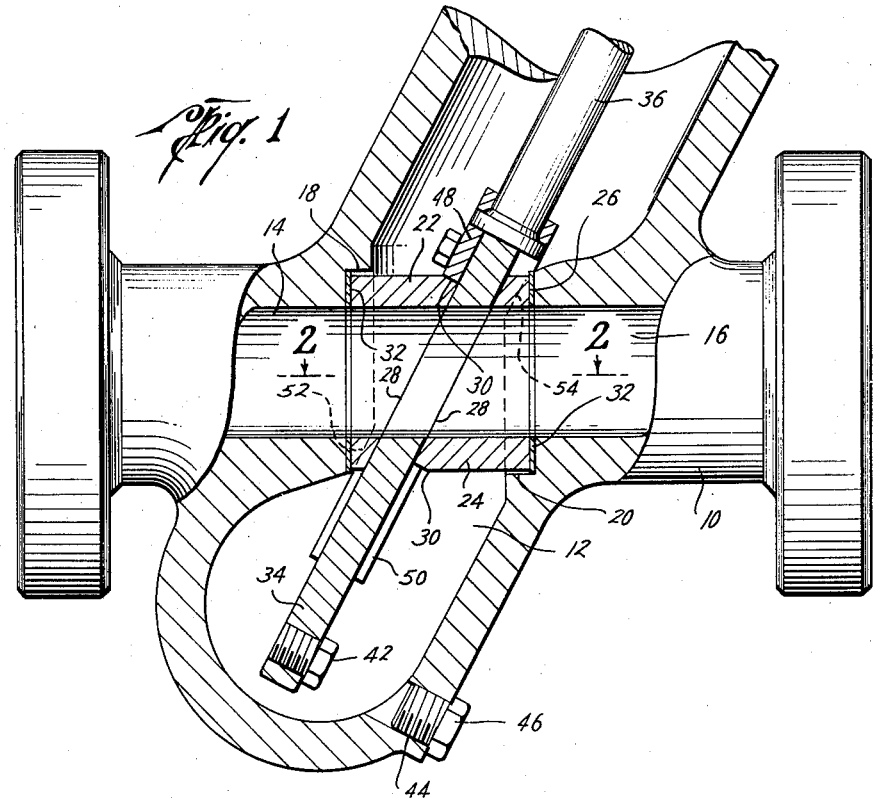
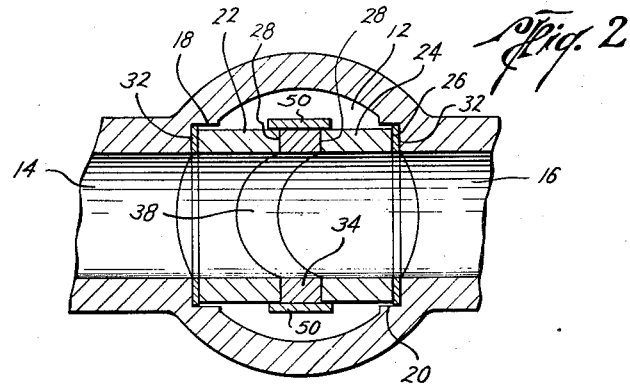
Calvin D. Dunbar
INVENTOR.
BY Charles E. Lightfoot
ATTORNEY

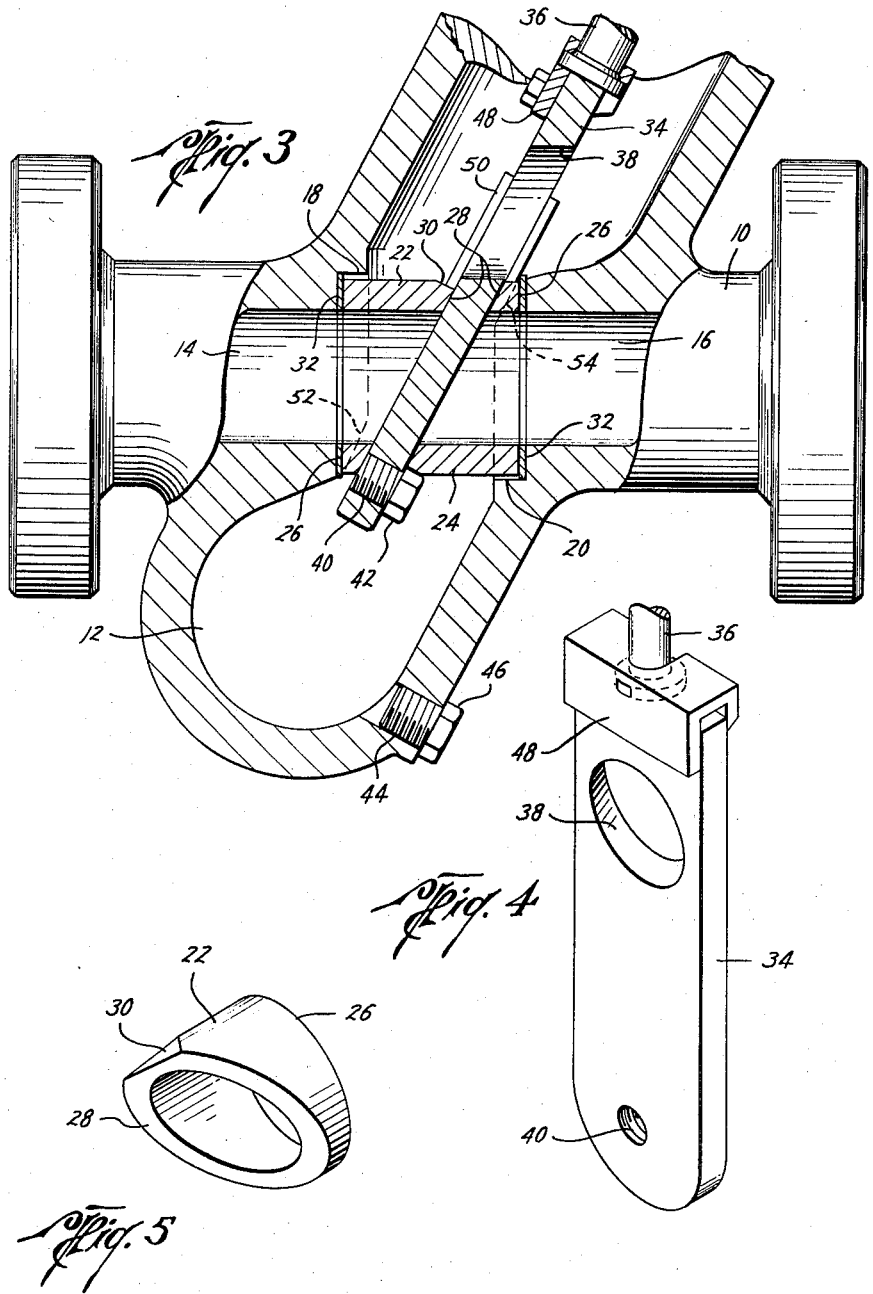

United States Patent Office 2,851,242
Patented Sept. 9, 1958

2,851,242

GATE VALVE

Calvin D. Dunbar, Houston, Tex.

Application July 7, 1953, Serial No. 366,459

4 Claims. (Cl. 251—170)

This invention relates to a gate valve, and more particularly to a valve of the sliding gate type having improved means for causing the gate to sealingly engage the valve seats in the open and closed positions of the valve.

In valves of the sliding gate type, as heretofore commonly constructed, it has been customary to provide means for causing the valve to sealingly engage the valve seats, such means sometimes taking the form of resilient elements effective to urge separately formed valve seat members into sealing contact with the opposite faces of the valve gate, and at other times being in the form of expansible valve gate mechanism by which a valve gate whose parts are relatively movable is expanded into sealing engagement with the valve seats.

Such valves, as heretofore usually provided, posses various serious disadvantages, among which are, the wearing of the parts due to movement of the valve gate while in sealing contact with the seats, or the failure of the parts of an expansible gate to move to retracted positions before initial opening or closing movements of the gate, which results in sticking of the valve and extreme wear on the gate and valve seats.

The present invention has for an important object the provision of a gate valve wherein the above disadvantages are avoided and in which the parts are effectively relieved from compressive stresses during the opening and closing movements of the valve.

Another object of the invention is to provide a gate valve embodying means for causing the gate and valve seats to be moved into sealing engagement in the open and closed positions of the valve but which is operable upon initial movement of the gate from one position to the other to immediately remove the force which urges the gate and seats toward each other.

A further object of the invention is the provision of a gate valve wherein the gate is freely slidable between the valve seats during opening and closing movements of the valve, but in which the parts are brought into tightly sealing engagement when the valve reaches either of said positions.

A still further object of the invention is to provide a gate valve of simple design and rugged construction, having few parts, and which may be easily and economically manufactured.

The above and other important objects and advantages of the invention will best be understood from the following detailed description, constituting a specification of the same, when considered in conjunction with the annexed drawings, wherein—

Figure 1 is a side elevational view of the invention, partly broken away and partly in cross-section, showing the valve in open position;

Figure 2 is a cross-sectional view taken along the line 2—2 of Figure 1, looking in the direction indicated by the arrows;

Figure 3 is a view similar to that of Figure 1, showing the valve in closed position;

Figure 4 is a perspective view of the valve gate structure, removed from the surrounding parts of the valve; and, Figure 5 is a perspective view of one of the valve seat members removed from the valve.

Referring now to the drawings in greater detail, the invention is illustrated in connection with a gate valve of the through conduit type, having a housing 10, providing an interior valve chamber 12, in which the gate and valve seats are located. Aligned ports 14 and 16 in opposite walls of the housing are provided, whose inner ends are surrounded by enlarged counterbores or annular recesses 18 and 20 respectively, within which valve seat members 22 and 24, respectively, are seated.

Each of the valve seat members 22 and 24 is of cylindrical formation, and preferably having an external diameter which is slightly smaller than the diameter of the recess or counterbore within which the member is seated, so that the member may be capable of slight movement transversely of the axis of the flowway through the valve. Each valve seat member has an outer end surface, indicated at 26, which lies in a plane normal to the axis of the flowway, and an inner surface 28, which is disposed at an angle to the axis of the flowway. The valve seat members are also provided with beveled faces, as indicated at 30, at their inner ends for a purpose later to be made apparent. Suitable means, such as sealing rings 32, may be disposed in the counterbores, in engagement with the bottom thereof, and with which the outer faces of the seat members are engageable, to provide a tight seal between the members and the valve housing. The inner end faces of the valve seat members are arranged in spaced parallel relation when the parts are assembled, in the manner illustrated, and a valve gate 34, of generally plate-like formation is slideably positioned between the inner end faces of the members.

The valve gate is arranged at the same angle to the axis of the flowway as that of the inner faces of the seat members, and is in sliding contact therewith. At its outer end the gate 34 is attached to a suitable valve stem 36, whereby the gate may be moved to open or closed position, and the gate is provided with an opening 38, therethrough, which is adapted to be brought into and out of registration with the openings through the valve seat members to open and close the valve. The ports 14 and 16 and the opening 38 form the flowway of the valve. Adjacent its inner end the valve gate is provided with an internally threaded opening 40, for the reception of a lower stop element 42, which may conveniently take the form of a bolt, and the housing 10 is also provided with an opening 44, leading into the lower portion of the valve chamber, and which is of greater diameter than the bolt 42, whereby the bolt may be inserted through the opening for attachment to the valve gate. An upper stop element 48 is provided on the valve gate, which in the present illustration, may be a part of the securing means by which the stem 36 is attached to the gate. The opening 44 of the housing may be conveniently closed by means of a screw plug 46.

The valve gate may also be provided with longitudinally disposed side plates 50, 50, on each side thereof, which plates extend somewhat beyond the seat engaging surfaces of the valve gate, in position to engage the exteriors of the seat members 22 and 24, to confine the inner ends of the seat members between the side plates, in all positions of the valve gate. As best seen in Figures 1 and 3 of the drawings, the interior of the housing 10 may be cut away at the counterbores 18 and 20, as indicated at 52 and 54, to provide clearance for the ready insertion of the valve seat members into the counterbores in assembling the valve structure, and to provide ample clearance for movement of the valve gate to its open or closed position.

The valve chamber 12 is preferably arranged on an angle to the axis of the flowway, corresponding to the angular position of the valve gate.

In assembling the parts the rings 32 may be placed in the counterbores 18 and 20, and the valve seat members 22 and 24 then inserted in the counterbores, whereupon the valve gate, with the lower stop element 42 removed may be inserted between the seat elements and the lower stop attached to the gate by inserting the same through the opening 44 in the valve housing. With the parts thus assembled the valve bonnet, not shown, may be secured in place on the housing with the stem 36 extending therethrough, whereby the valve may be readily moved to open or closed position.

In operating the valve, assuming that the same is in its open position, as illustrated in Figure 1 with the upper stop element 48 in contact with the bevelled surface 30 of the seat element 22, the valve stem may be operated to move the gate upwardly in the valve chamber towards the closed position of the valve, seen in Figure 3, whereupon the upper stop element will be moved out of engagement with the surface 30 of the seat member 22 and the lower stop element 42 will be moved into engagement with the bevelled surface 30 of the seat member 24. Upon engagement of the lower stop element with the seat member 24, further upward movement of the gate causes the seat element to move slightly with the gate, until such movement of the seat member is arrested by engagement of the same with the interior of the counterbore 20, after which upward movement of the gate will exert a force on the seat member 24 tending to move the same into sealing engagement with the seal ring 32 and also cause the gate to wedgingly engage the inner end surface of the seat member 22, to move the latter into sealing engagement with its corresponding ring 32. In this manner the gate will be moved into sealing contact with the seat members, and will cause the seat members to move into sealing engagement with their respective seal rings.

Upon downward movement of the stem 36, to move the gate from closed to open position, it will be apparent that the lower stop element will be moved out of contact with the surface 30 of the seat member 24, whereupon the expanding force exerted by the gate on the seat members will immediately be relieved, permitting the gate to slide freely between the seat members toward open position. As soon as the gate reaches its open position in which the opening 38 of the gate is in registration with the openings of the seat members, the upper stop element 48 will engage the surface 30 of the seat member 22, to move this member with the gate into contact with the inner wall of the counterbore 18, thereby causing the gate to exert a force on the member 22 tending to urge the same into sealing engagement with its seal ring 32 and to wedgingly engage the seat member 24, to force the same into sealing engagement with its seal ring. The gate will thus be sealingly engaged with the seat members when the valve is in open position.

It will also be seen that the valve may be readily disassembled by removing the valve bonnet, and then removing the lower stop element 42 through the opening 44 of the housing, whereupon the gate may be removed from between the seat members 22 and 24, and these members may be readily removed from the housing.

It will thus be seen that the invention, constructed as described above, provides a gate valve in which the gate and valve seats are brought into sealing engagement when the valve is moved to its open or closed position, and in which the wedging force exerted by the gate on the seat members is immediately relieved upon movement of the gate out of its open or closed position, to permit free sliding movement of the gate during its opening and closing movement.

While the invention has been disclosed herein in connection with a certain specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention what is claimed as new and desired to secure by Letters Patent is:

1. A gate valve comprising, a housing forming a valve chamber having axially aligned ports and an annular recess surrounding the inner end of each of the ports, annular valve seat members disposed in said recesses for axial movement relative to the ports and whose inner end surfaces are disposed in parallel spaced relation at an angle out of the normal to the axis of the ports, a gate slidably positioned between the inner end faces of the seat members and having an opening adapted to be brought into and out of registration with said ports, and means on said gate positioned to engage said members upon movement of the gate to open and closed positions for causing the gate to exert forces on said members in a direction to move said members axially.

2. A gate valve comprising, a housing forming a valve chamber having axially aligned ports, annular valve seat members in the chamber disposed substantially in axial alignment with said ports, each of said members having an outer end face disposed substantially normal to the axis of the ports and said members having inner end faces disposed in parallel spaced relation at an angle out of the normal to said axis, a valve gate in the chamber slidably positioned between the seat members and having opposite surfaces in sliding contact with the inner end faces of the members, said gate having an opening adapted to be brought into and out of registration with said ports, means on said gate positioned to engage one of said members upon movement of said gate to closed position for causing the gate to exert forces on said members in a direction to move the members axially into sealing engagement with said housing and gate, and means on said gate positioned to engage the other of said members upon movement of the gate to open position for causing the gate to exert forces on said members in a direction to move said members axially into sealing engagement with said gate.

3. A gate valve comprising, a housing forming a valve chamber having axially aligned ports and an annular recess surrounding the inner end of each of the ports, annular valve seat members disposed in said recesses for axial movement relative to the ports and whose inner end surfaces are disposed in spaced parallel relation at an angle out of the normal to the axis of the ports, a slidably movable valve gate positioned between said members and having opposite faces in sliding contact with said surfaces, said gate having an opening therethrough adapted to be brought into and out of registration with said ports and means on said gate positioned to engage said members upon movement of the gate to open and closed positions for causing the gate to exert forces on said members in a direction to move said members axially to cause said surfaces to sealingly engage said faces.

4. A gate valve comprising, a housing forming a valve chamber having axially aligned ports and an annular recess surrounding the inner end of each of the ports, annular valve seat members disposed in said recesses for axial movement relative to the ports and whose inner end surfaces are disposed in spaced parallel relation at an angle out of the normal to the axis of the ports, a slidably movable valve gate positioned between said members and having opposite faces in sliding contact with said surfaces, said gate having an opening therethrough adapted to be brought into and out of registration with said ports, means on said gate positioned to engage one of said members upon movement of said gate in one direction when said opening is in registration with said ports for causing the gate to exert forces on said members in directions to move said members axially to cause said members to sealingly engage said gate and housing and to engage the other of said members upon movement of said gate in the other direction when said opening is out of registration with said ports for causing the gate to exert forces on said members in directions to move said members axially to sealingly engage said gate and housing.

References Cited in the file of this patent

UNITED STATES PATENTS

| | | |
|---|---|---|
| 762,436 | Osgood | June 14, 1904 |
| 1,442,204 | Wilson | Jan. 16, 1923 |
| 1,752,456 | Pillatt | Apr. 1, 1930 |
| 1,926,095 | Graves | Sept. 12, 1933 |
| 2,150,254 | Sorensen | Mar. 14, 1939 |